US011993331B2

(12) United States Patent
Perlo et al.

(10) Patent No.: US 11,993,331 B2
(45) Date of Patent: May 28, 2024

(54) RIDE ON VEHICLE WITH AIR CONDITIONING

(71) Applicant: INTERACTIVE FULLY ELECTRICAL VEHICLES S.R.L., Sommariva del Bosco (IT)

(72) Inventors: Pietro Perlo, La Loggia (IT); Davide Penserini, La Loggia (IT); Sergio Pozzato, La Loggia (IT); Marco Grosso, La Loggia (IT); Riccardo Introzzi, La Loggia (IT); Sandro De Pasquale, La Loggia (IT); Gioele Sabato, La Loggia (IT); Marco Biasiotto, La Loggia (IT)

(73) Assignee: INTERACTIVE FULLY ELECTRICAL VEHICLES S.R.L., La Loggia (IT)

( * ) Notice: Subject to any disclaimer, the term of this patent is extended or adjusted under 35 U.S.C. 154(b) by 640 days.

(21) Appl. No.: 17/259,696

(22) PCT Filed: Jul. 24, 2019

(86) PCT No.: PCT/IB2019/056320
§ 371 (c)(1),
(2) Date: Jan. 12, 2021

(87) PCT Pub. No.: WO2020/026082
PCT Pub. Date: Feb. 6, 2020

(65) Prior Publication Data
US 2021/0316806 A1      Oct. 14, 2021

(30) Foreign Application Priority Data
Jul. 30, 2018   (IT) ..................... 102018000007637

(51) Int. Cl.
*B62J 43/30*    (2020.01)
*B60H 1/00*    (2006.01)
(Continued)

(52) U.S. Cl.
CPC .......... *B62J 43/30* (2020.02); *B60H 1/00407* (2013.01); *B60L 1/003* (2013.01);
(Continued)

(58) Field of Classification Search
CPC ..... B60H 1/00407; B60L 1/003; B60L 8/003; B60L 2200/12; B62J 9/10; B62J 17/04;
(Continued)

(56) References Cited

U.S. PATENT DOCUMENTS 3,513,928 A * 5/1970 Emmons ................... B60K 1/00
                                                        180/205.1
6,942,053 B2 * 9/2005 Hinton .................... B62D 61/12
                                                        180/209
(Continued)

FOREIGN PATENT DOCUMENTS

EP      0035134 A2     9/1981
EP      3339152 A1     6/2018
(Continued)

OTHER PUBLICATIONS

International Search Report and Written Opinion of the International Searching Authority for International Application No. PCT/IB2019/056320 dated Dec. 18, 2019.

*Primary Examiner* — Kevin Hurley
*Assistant Examiner* — Felicia L. Brittman
(74) *Attorney, Agent, or Firm* — Heslin Rothenberg Farley & Mesiti P.C.; Victor A. Cardona, Esq.

(57) ABSTRACT

A ride-on vehicle, in particular a bicycle or a three-wheel vehicle, more in particular a purely electric or pedal assist bicycle or three-wheel vehicle, including an electrically-
(Continued)

Figure 1:
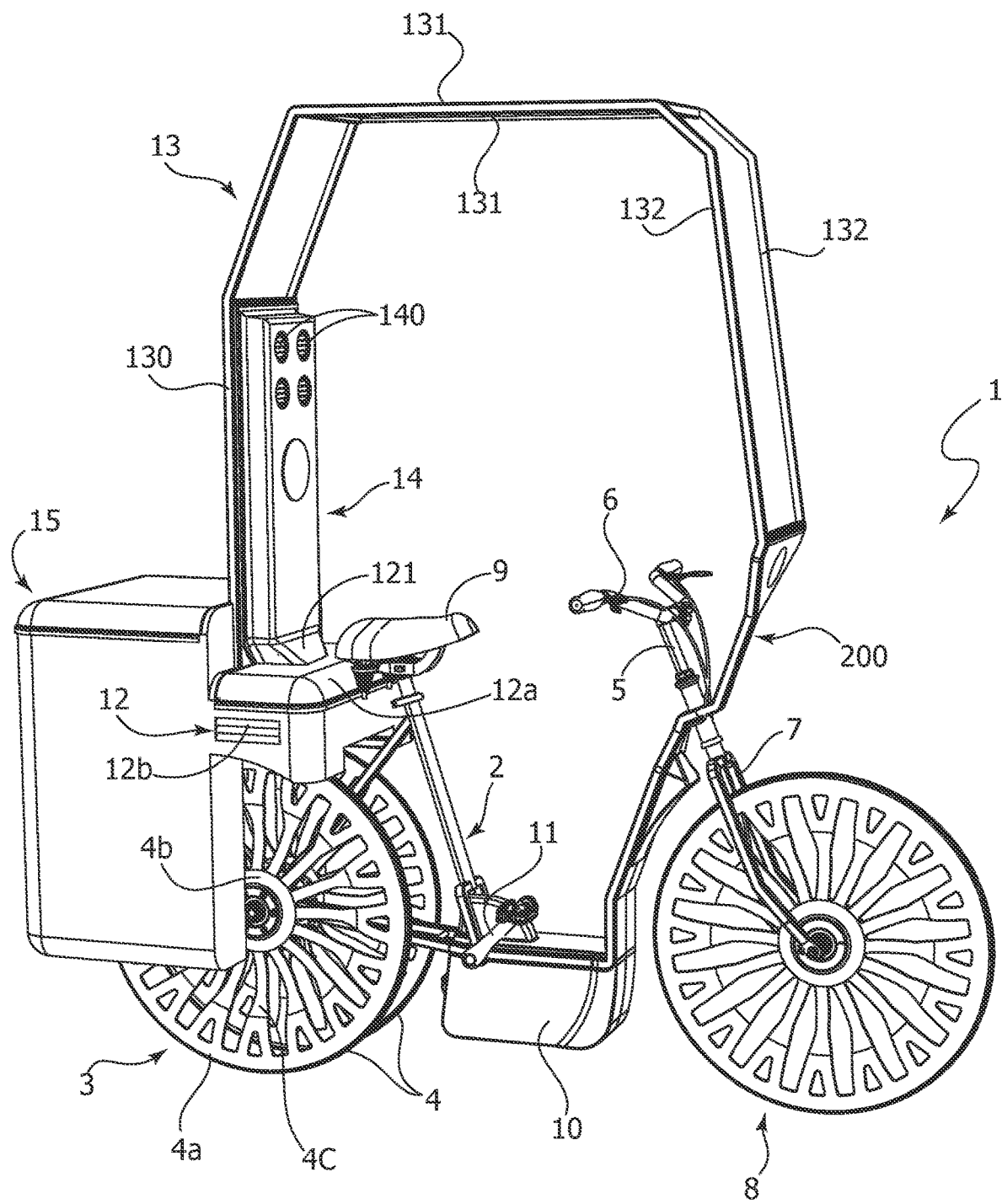

driven air conditioning unit carried by the frame of the vehicle. An auxiliary supporting structure is connected to the frame of the vehicle, and in one example includes two rear uprights transversally spaced from each other, extending above the saddle, and continuing into two upper beams and then into two front uprights, whose lower ends are connected to a frame portion which extends in front of the handlebar. An air guiding structure is associated to the auxiliary supporting structure and is in communication with an outlet of the air conditioning unit and has one or more outlets for the flow of conditioned air, which are configured for directing jets of conditioned air towards and/or around a body of a user.

15 Claims, 7 Drawing Sheets

(51) Int. Cl.
*B60L 1/00* (2006.01)
*B60L 8/00* (2006.01)
*B62J 9/10* (2020.01)
*B62J 17/04* (2006.01)
*B62J 27/20* (2020.01)
*B62J 33/00* (2006.01)
*B62J 43/13* (2020.01)
*B62M 6/40* (2010.01)
*B62M 6/80* (2010.01)

(52) U.S. Cl.
CPC ............... *B60L 8/003* (2013.01); *B62J 9/10* (2020.02); *B62J 17/04* (2013.01); *B62J 27/20* (2020.02); *B62J 33/00* (2013.01); *B62J 43/13* (2020.02); *B62M 6/40* (2013.01); *B62M 6/80* (2013.01); *B60L 2200/12* (2013.01)

(58) Field of Classification Search
CPC ... B62J 27/20; B62J 33/00; B62J 43/13; B62J 43/30; B62M 6/80; Y02T 10/7072
USPC ...................................... 180/206.1
See application file for complete search history.

(56) References Cited

U.S. PATENT DOCUMENTS

| 10,259,287 | B2* | 4/2019 | Reynolds | ........... B60H 1/00407 |
| 10,665,140 | B1* | 5/2020 | Ahn | ....................... G06Q 10/02 |
| 2018/0065448 | A1 | 3/2018 | Reynolds | |

FOREIGN PATENT DOCUMENTS

| JP | S5233848 U | | 3/1977 |
| JP | 2015016825 A | * | 1/2015 |
| JP | 2015016825 A | | 1/2015 |
| WO | 2017149960 A1 | | 9/2017 |
| WO | 2018138594 A1 | | 8/2018 |

* cited by examiner

RIDE ON VEHICLE WITH AIR CONDITIONING

CROSS REFERENCE TO RELATED APPLICATIONS

This application is a national stage filing tinder section 371 of International Application No. PCT/IB2019/056320, filed on Jul. 24, 2019, published in English on Feb. 6, 2020 as WO2020/026082A1 and which claims priority to Italian Application No. 102018000007637, filed on Jul. 30, 2018, the entire disclosure of these applications being hereby incorporated herein by reference.

FIELD OF THE INVENTION

The present invention relates to vehicles of the ride-on type, in particular bicycles or three-wheel vehicles, and more in particular to purely electric or pedal assist bicycles or three-wheel vehicles, of the type comprising a frame, a rear wheel unit carried by the frame and a front wheel unit carried by a steering unit associated to the frame and including a handlebar, a saddle and an electric battery carried by the frame. It is to be understood that the invention also covers any other vehicles of the ride-on type, including motorbikes or conventional bicycles, electric or with pedal assist.

PRIOR ART

Document EP 3 339 152 A1 shows a pedal three-wheel vehicle, of the above indicated type. The solution disclosed in this document has the drawback of including a bulky and complex structure, which includes a roof supported by a heavy rear structure, mounted on the vehicle rear axle. The weight of this structure renders this vehicle of little use, particularly in hot climates.

It is to be noted that the use of an air conditioning system associated to a vehicle driving seat is known for example from document JP S52-33848 U, for a seat of a conventional type (i.e. not a ride-on saddle) for the driving cabin of an earth-moving machine or a crane (which is provided with a steering wheel, and not with a handlebar). A similar system is also known from document JP 2015 016825 A, also for a vehicle with a conventional seat (not of the ride-on type) and with a steering-wheel (not with a handlebar). These solutions are not adapted to be implemented on vehicles of the type to which the present invention is directed.

OBJECT OF THE INVENTION

The object of the present invention is that of providing a vehicle of the above indicated type which provides a high comfort for the user even in hot or cold environments.

A further object of the invention is that of providing a vehicle of the above indicated type which can be advantageously used also as a vehicle for delivery of perishable food, which must be kept at a low temperature, or cooked food, which has to be kept in a heated environment.

A further object of the invention is that of providing a vehicle of the above indicated type whose structure includes a cell for protection of the user.

A further object of the invention is that of providing a vehicle of the above indicated type, in particular a vehicle of a purely electric or pedal assist type, provided with an electric motor and a supply electric battery, wherein renewable energy sources are arranged for recharging the battery and supplying the motor.

Still a further object of the invention is that of achieving all the above indicated goals with a vehicle having a simple and inexpensive structure.

SUMMARY OF THE INVENTION

In view of achieving the above indicated object, the invention provides a vehicle of the above indicated type which is characterized in that:
- the frame carries an electrically-operated air conditioning unit, supplied by said battery and including at least one inlet for the intake of ambient air and an outlet for emitting a flow of conditioned air,
- to the frame of the vehicle there is connected an auxiliary supporting structure comprising at least one rear upright which rises vertically above the saddle from an area located at the rear of the saddle,
- to said auxiliary supporting structure there is associated an air guiding structure, which is in communication with the outlet of the conditioning unit and has one or more outlets for emitting conditioned air, which are configured for directing jets of conditioned air towards the body of the user.

The conditioning unit comprises a supporting casing defining said inlet for the intake of ambient air and said outlet for emitting a flow of conditioned air. The conditioning unit further comprises an endless circuit for a refrigerant, arranged inside the casing and including a compressor driven by an electric motor, a condenser which receives the refrigerant compressed by the compressor, an expansion valve for expanding the fluid coming from the condenser and an evaporator which receives expanded fluid from said expansion valve and feeds fluid evaporated in said evaporator to said compressor. The conditioning unit further comprises at least one electrically actuated fan for generating a flow of air through the evaporator and through said outlet, for conveying a flow of refrigerated air into said air guiding structure. The system can be also configured for generating a flow of air through the condenser, in order to obtain a flow of heated air.

Conditioning units of the above indicated type, having sufficiently reduced dimensions for the use illustrated herein, are known and commercially available.

In one embodiment, the auxiliary supporting structure comprises two rear uprights which are transversally spaced apart from each other, and extend above the saddle, the uprights continuing into two upper beams and then into two front uprights whose lower ends are connected to a frame portion which extends in front of the handlebar. In an exemplary embodiment, the front uprights also carry a windshield.

According to a further feature, preferably the auxiliary supporting structure carries one or more arrays of photovoltaic panels for recharging the battery and supplying the conditioning unit.

In one example, the air guiding structure comprises a hollow panel carried by the two rear uprights so as to act also as a backrest and provided with a plurality of air emitting outlets adapted to direct jets of conditioned air towards the back of the user. In a further example, the air guiding structure comprises two conduits which extend along said rear uprights and along said upper beams, and/or along said front uprights, said conduits being provided with outlets for emitting conditioned air.

According to a further optional feature, the outlets are arranged in a way such as to generate blade-like jets (J) of conditioned air, at the two sides of the user, to obtain a kind of insulation of the user with respect to the outside environment.

In a particularly preferred application, the vehicle is of the type which has formed the subject of International Patent Application PCT/IB 2018 050196 of the same Applicant. In this solution, the rear wheel unit of the vehicle includes two rear wheels arranged side-by-side and having substantially identical diameters and respective hubs which are coupled in rotation with each other. Each rear wheel comprises a peripheral circumferential portion for contact with the ground which is connected to a central wheel hub by means of one or more elastic elements adopted to elastically deforming a radial direction, in the use of vehicle, in the portion of the wheel comprised between the wheel hub and the portion of the wheel which is in contact with the ground, so as to enable a lateral tilting of the vehicle at a bend. The two rear wheels are axially spaced from each other by a length between 0.2 and 0.95 times their diameter, preferably between 0.3 and 0.4 times their diameter, so that the vehicle has a stable upright static position, due to the support on the two rear wheels and the front wheel unit, while at the same time the two rear wheels are close enough so that the difference in their peripheral speeds at a bend is sufficiently reduced to be compensated by the different elastic deformations of the elastic elements of the two rear wheels.

According to a further important feature of the invention, the vehicle can be provided with a luggage container and the aforesaid conditioning unit can be provided for conveying refrigerated or heated air into the luggage container.

Due to this feature, the vehicle can also be used as a vehicle for delivering food to be kept at a refrigerated temperature or at a temperature greater than the ambient temperature.

As clearly apparent, the invention provides a turnaround in the market of vehicles of this type, and in particular in the market of bicycles, opening thereby the way to their use also in countries with a very hot or a very cold climate.

DETAILED DESCRIPTION OF THE INVENTION

Figure 2A:
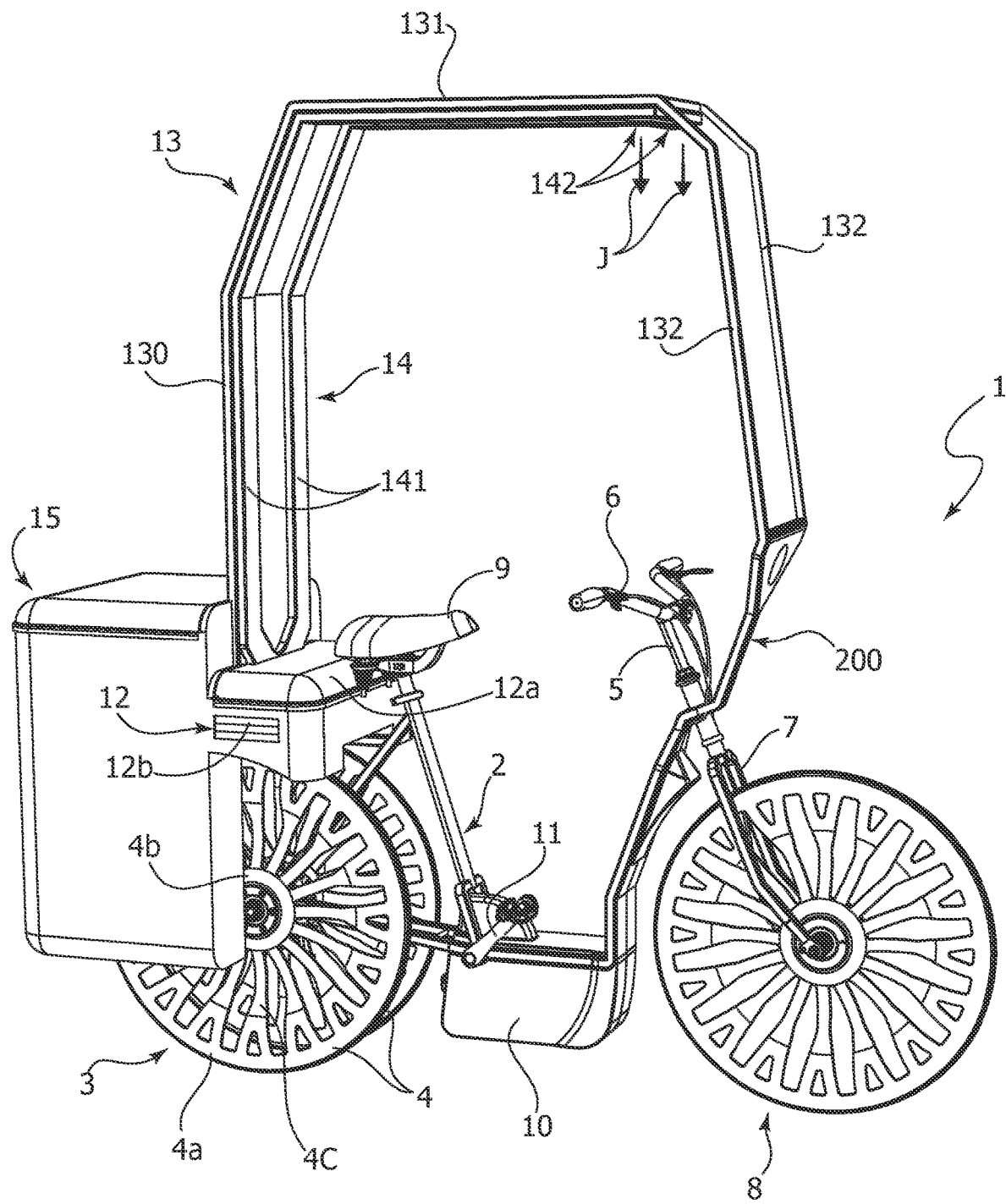
Figure 2B:
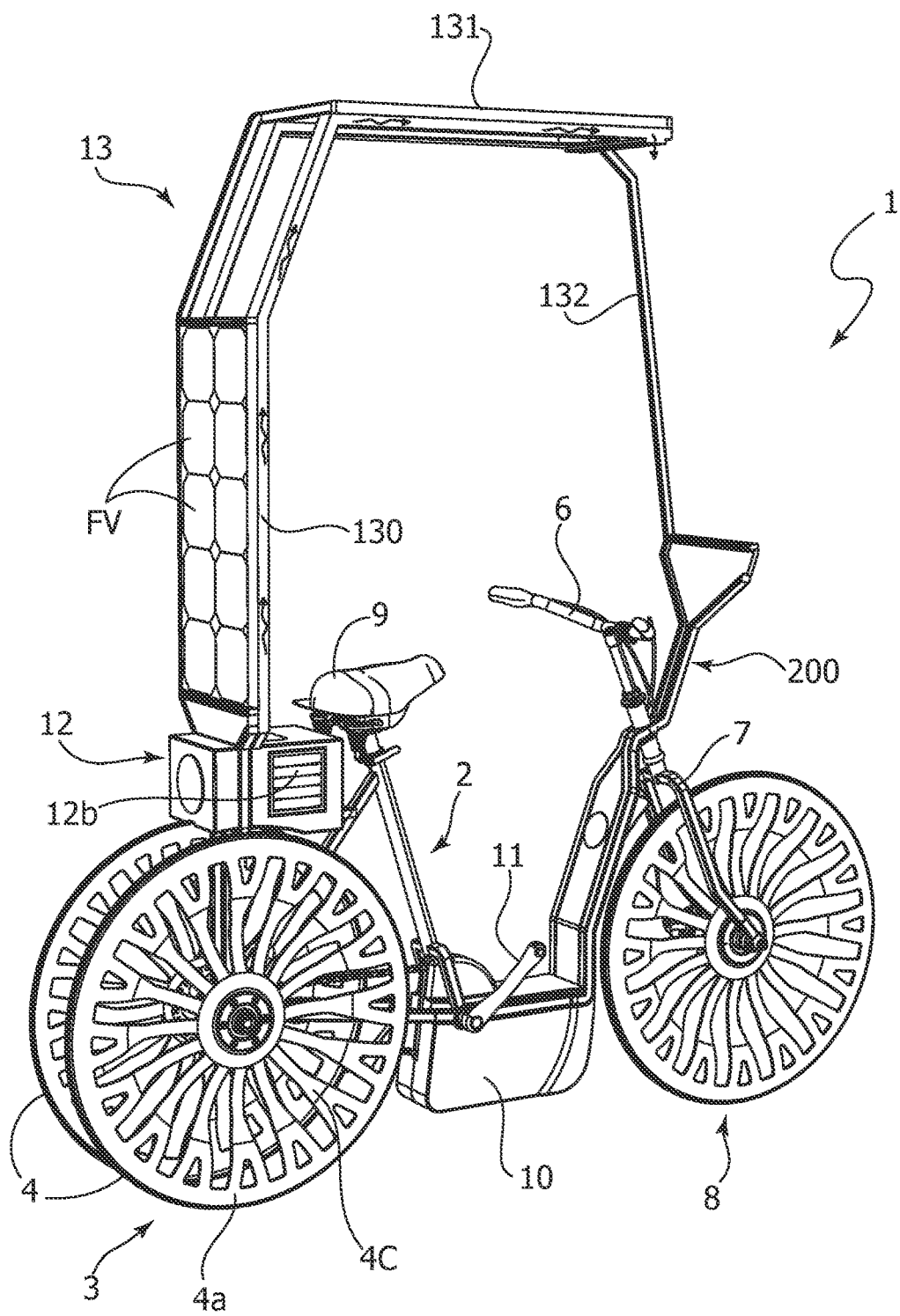
Figure 3:
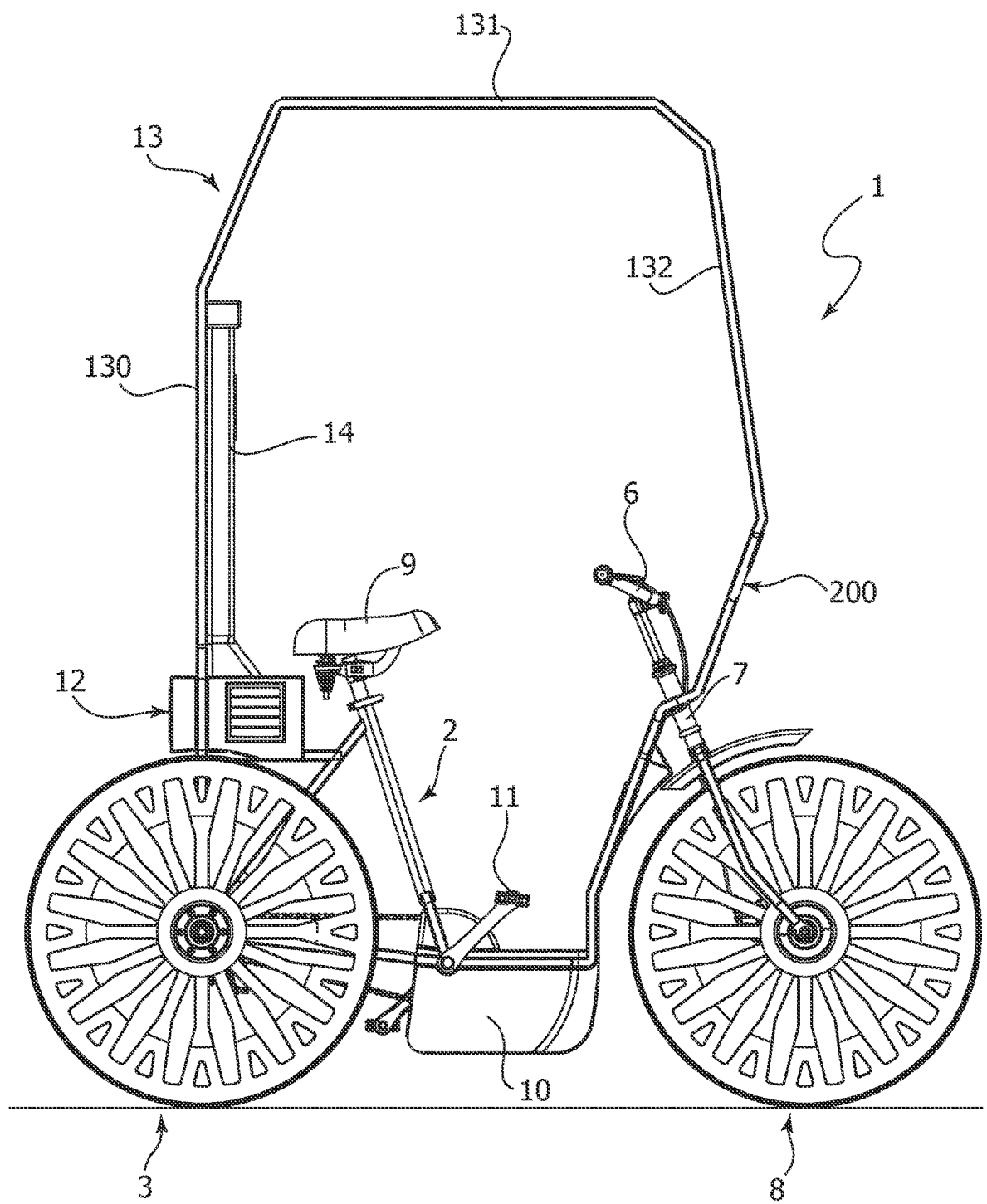
Figure 4:
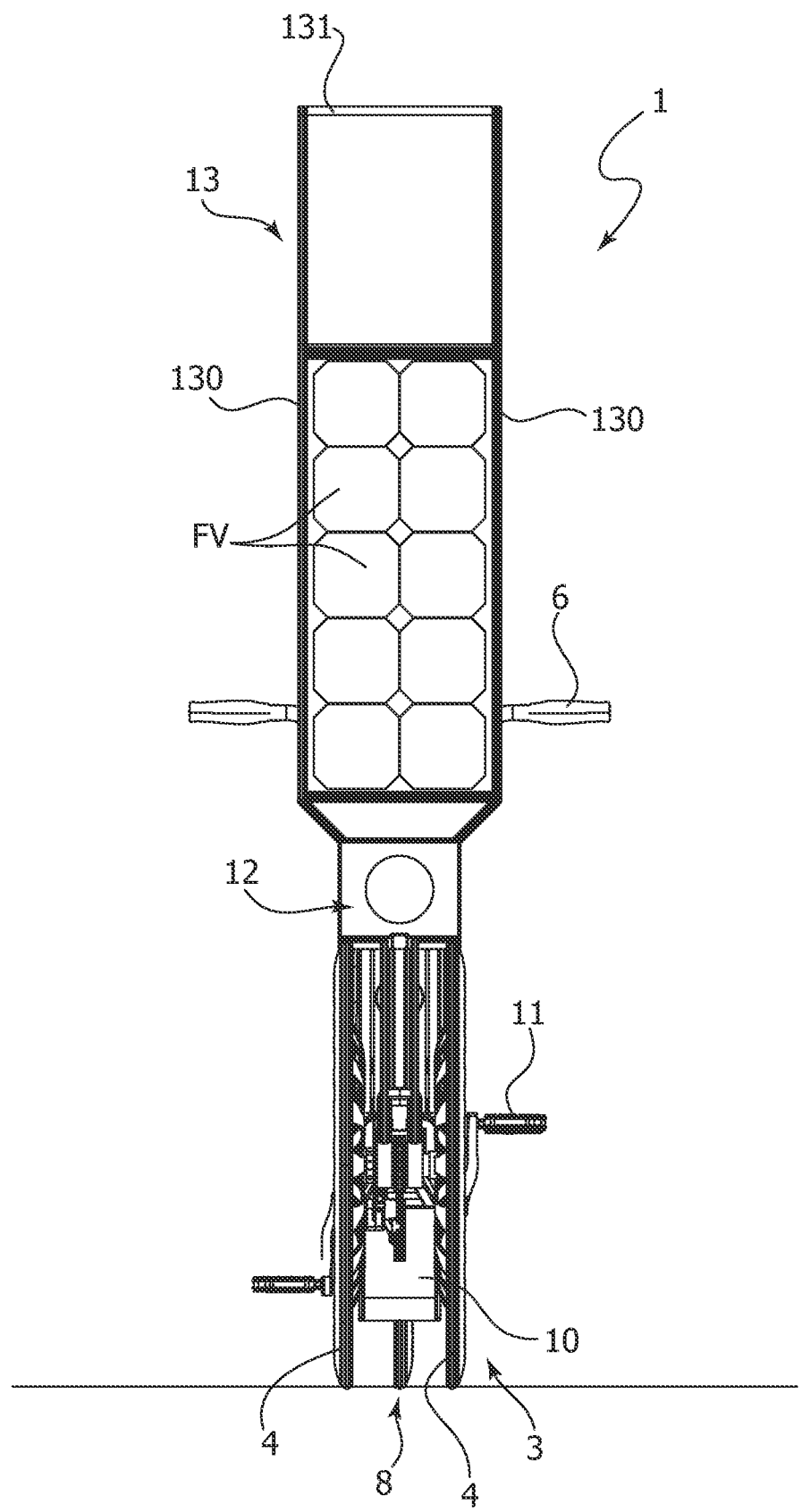
Figure 5:
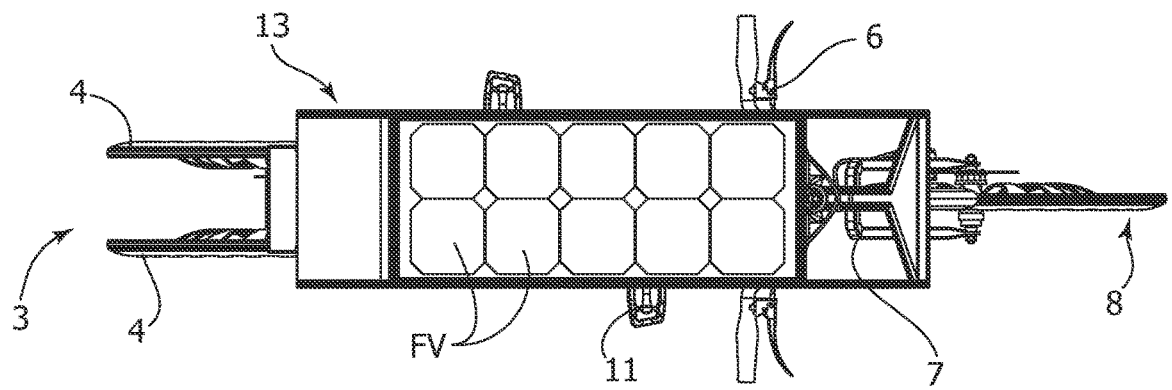
Figure 6:
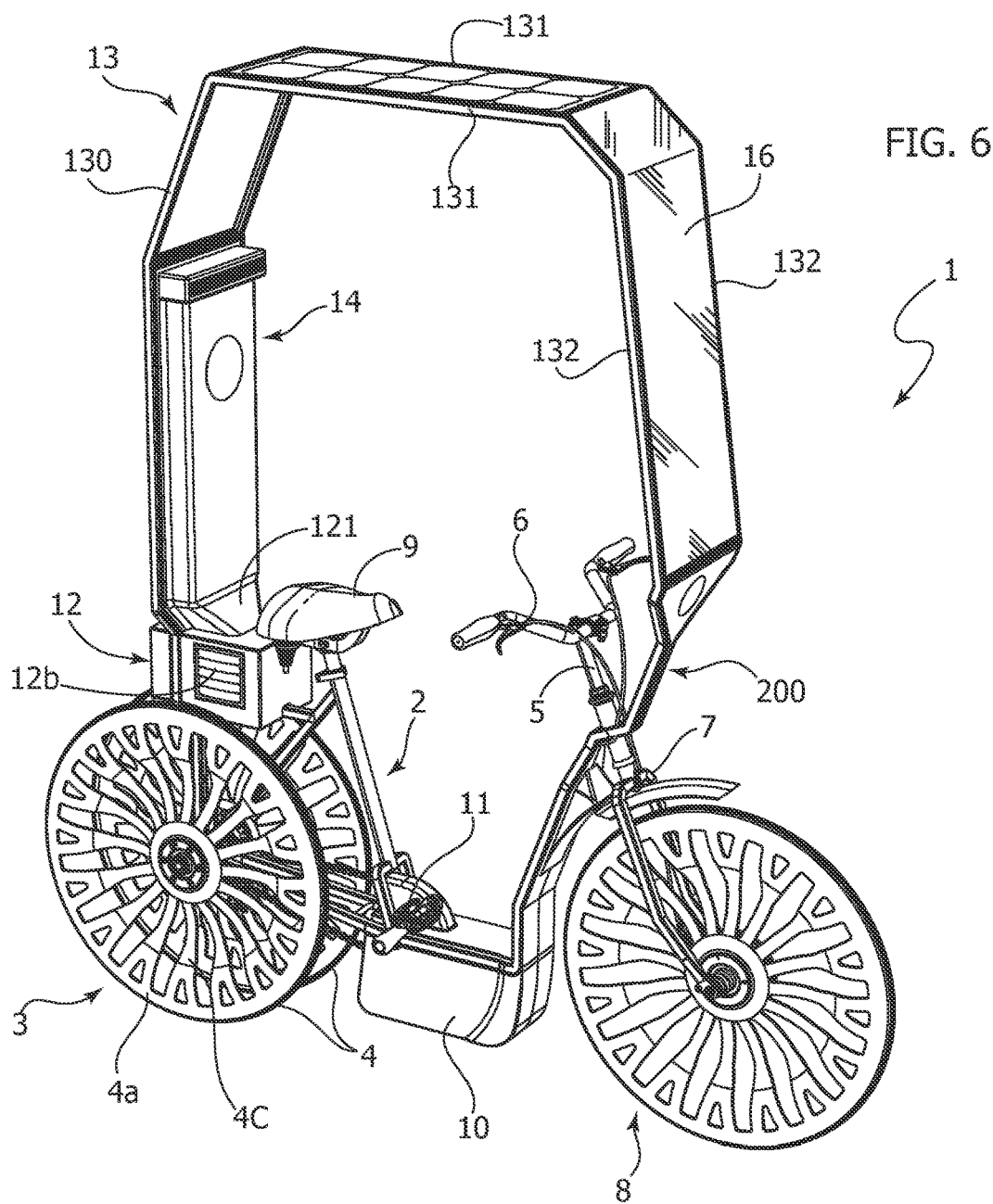
Figure 7:
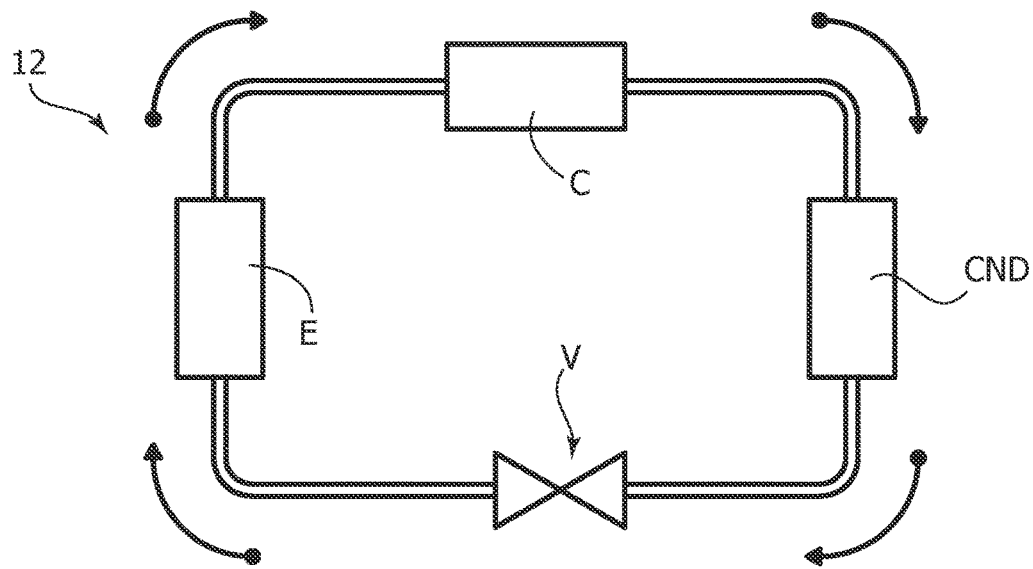
Figure 8:
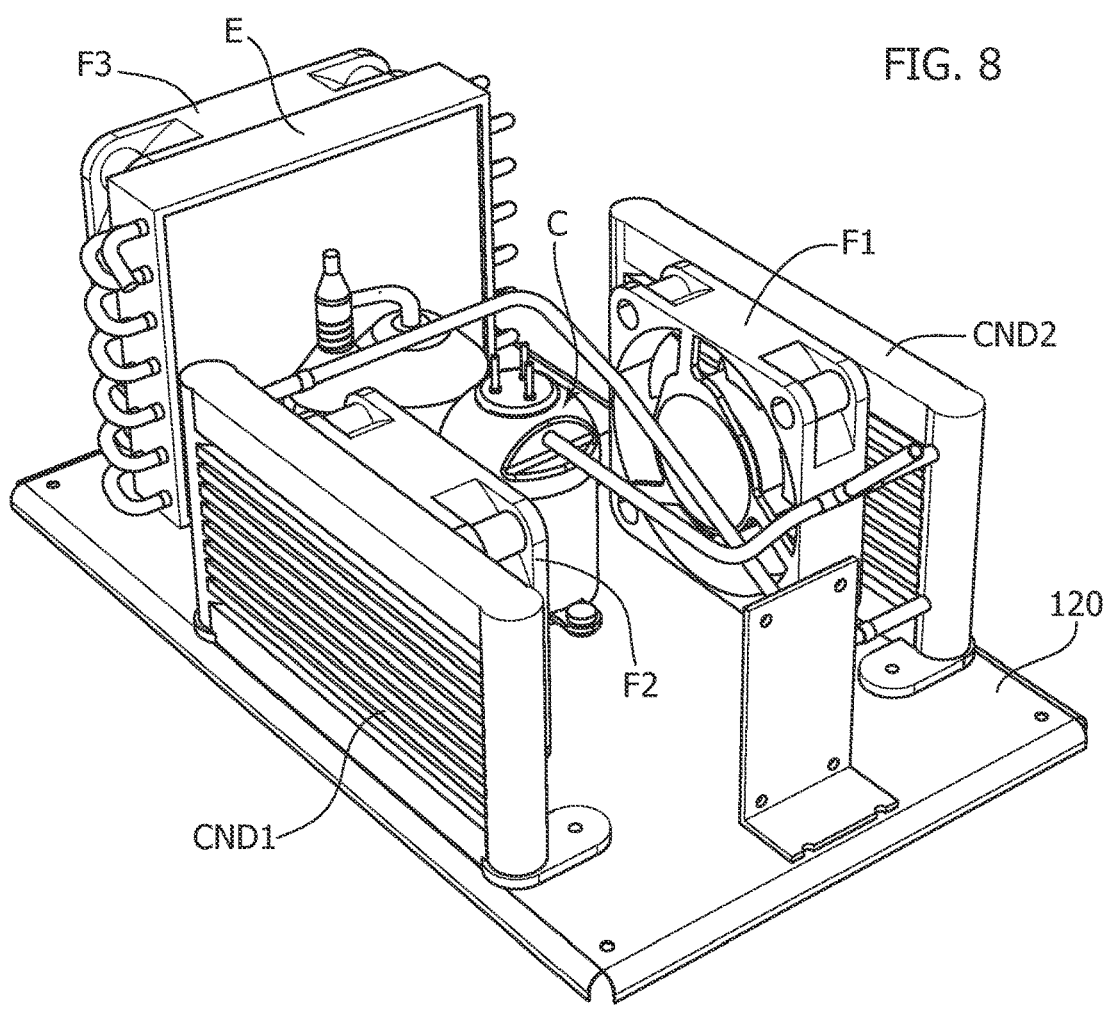

The invention will be now described with reference to the annexed drawings, given purely by way of non-limiting example, in which:

FIG. 1 is a perspective view of a first exemplary embodiment of the vehicle according to the invention, FIGS. 2A, 2B are perspective views of a second exemplary embodiment of the vehicle according to the invention, FIGS. 3-6 are a side view, a front view, a plan view and a perspective view of a third exemplary embodiment of the vehicle according to the invention, FIG. 7 shows a diagram of the principle of operation of the air conditioning unit, and FIG. 8 is a perspective view of an example of construction of the conditioning unit, without its casing.

The annexed drawings show the application of the principles which are at the basis of the present invention to a three-wheel vehicle of the type which has already formed the subject of international patent application PCT/IB 2018 050196 of the same Applicant. However, it is to be understood that the present invention is applicable to any vehicle of a ride-on type, and is particularly adapted to be used also on conventional bicycles, i.e. having a single front wheel and a single rear wheel, preferably of the pedal assist type.

Turning to the example illustrated in the drawings, in FIG. 1 reference number 1 designates a vehicle configured as described in the above mentioned international patent application PCT/IB 2018 050196, having a frame 2 on which there are mounted a rear wheel unit 3 including two rear wheels 4 and a steering shaft 5 provided with a handlebar 6 connected to a front fork 7 caring a front wheel 8. The frame 2 also carries a saddle 9 and a pedal assisting unit 10, which can be made in any known way and includes an electric motor (not shown) connected to the pedal crank shaft 11 of the vehicle and a supply electric battery, which can be recharged (also not shown).

Also in accordance to the teachings of the above cited document, the two rear wheels 4 have substantially identical diameters and respective hubs coupled in rotation with each other and connected to the pedal crank shaft 11 by means of a chain or belt transmission (not shown). In the case of an electric vehicle, the motor can be arranged adjacent to the lower part of the saddle upright, close to the battery pack and can be connected to the hub of the rear wheels through a chain or belt, preferably with a fixed or variable ratio, between 1:3 and 1:10. This means that the pulley or toothed wheel secured to the shaft of the motor has a diameter between 3 and 10 times lower than the diameter of the pulley or toothed wheel placed on the hub which connects the rear wheels together. Also consistently with the teachings of the above cited document, each rear wheel comprises a peripheral circumferential portion 4a for contact with the ground, connected to the hub 4b of the wheel by means of one or more elastic elements adapted to be elastically deformed in an arched shape, along the radial direction, in use of the vehicle, in the portion of the wheel between the wheel hub and the portion of the wheel which is in contact with the ground, so as to enable a lateral tilting of the vehicle at a bend. In the example illustrated in FIG. 1, said elastic elements are constituted by a plurality of radial arms 4c formed by a cutting operation starting from a single sheet of metal or a plastic composite, having a uniform or variable thickness, constituting the body of the wheel and shaped according to an S-profile in a cross-sectional plane containing the wheel axis, so has to be adapted to be elastically deflected to vary the distance between their ends.

As already indicated, all the above mentioned details of construction relate to a preferred application of the present invention. However, it is not at all excluded the possibility of applying the invention to an electric conventional motor scooter, or a bicycle with a single front wheel and a single rear wheel and with pedal assist.

Turning to the two rear wheels 4, these wheels are axially spaced apart from each other by a length between 0.2 and 0.95 times their diameter, preferably between 0.3 and 0.4 times their diameter, so that the vehicle has a stable upright static position, thanks to the support on the two rear wheels and the front wheel unit, whereas the two rear wheels 4 are sufficiently close to each other that the difference between their peripheral speeds at a bend is sufficiently reduced for being compensated by the different elastic deformations of the elastic elements 4c.

According to the invention, the vehicle 1 is provided with an air conditioning unit 12, of compact size, carried by the frame 2. In the illustrated example, the air conditioning unit 12 is mounted on a carrier (not shown) arranged behind the saddle 9. The air conditioning unit has a casing 12a with two lateral walls provided with intake nets 12b.

FIG. 7 shows the diagram of the principle of operation of the unit 12. The unit 12 comprises an endless circuit for a refrigerant, including a compressor C actuated by an electric motor, a condenser CND which receives the fluid compressed by the compressor C, an expansion valve V, in which the fluid coming from the condenser CND is expanded and cooled, in a evaporator E which receives the expanded fluid and supplies the evaporated fluid to the inlet of the compressor C. The evaporator E is able to refrigerate an airflow conveyed through it by a fan, when a refrigerated airflow is needed. When instead a heated airflow must be produced, the unit is used as a heat pump, by causing an airflow through the condenser CND, which is able to transmit heat to this airflow. FIG. 8 is a perspective view of the components of a commercially available air conditioning unit. In FIG. 8, there is illustrated only the base plate 120 which supports the components of the air conditioning unit, the casing 12a being removed. In FIG. 8, there are shown the compressor C, two condenser modules CND1, CND2 arranged at the two sides of the unit, adjacent to the two intake grilles 12b of the casing, the evaporator E and the fan units F1, F2, F3 arranged and configured for in taking an airflow from the two side intake grilles 12b and for conveying this flow through the evaporator E, in order to generate a refrigerated airflow from an outlet 121 of the air conditioning unit 12.

With reference to FIG. 1, the frame 2 of the vehicle carries an auxiliary supporting structure 13 including a pair of rear uprights 130, which are transversally spaced apart from each other, which extend vertically upwardly above the saddle 9 starting from the area behind the saddle 9. The two uprights are continued into two upper longitudinal beams 131 and then in two front uprights 132 connected at their lower ends to a frame portion 200 which is rigidly connected to the frame 2 and extends in front of the steering unit 5 and the handlebar 6. In an alternative solution, the frame portion 200 and the front uprights 132 can end behind the steering unit, so as not to be of disturbance in driving the vehicle.

The configuration of the supporting auxiliary structure 13 shown in FIG. 1 is given purely by way of example, these auxiliary supporting structure could comprise a single central rear upright. Furthermore, the front uprights 132 could be omitted, in which case the frame portion 200 will not be necessary. Also the upper beams 131 could be omitted.

The outlet 121 for emitting conditioned air from the casing 12a of the air conditioning unit 12 is in communication with an air guiding structure 14. In the example illustrated in FIG. 1, the air guiding structure is constituted by a hollow wall 14, carried by the two rear uprights 130, acting as a backrest and provided with a plurality of air emitting outlets 140 configured for directing a flow of conditioned air towards the back of the user. If preferred, each outlet 140 could be provided with orientable louvers.

Also in the case of the example of FIG. 1, the vehicle is provided with a luggage container 15 which can be also adapted to the transport of perishable articles or products, to be kept at a temperature lower than the ambient temperature or products, in particular cooked food, to be kept at a temperature greater than the ambient temperature. In one case and the other, the air conditioning unit 12 could therefore be used as a refrigerator or as a heat pump, and could have its outlet in communication with the compartment of the luggage container 15. Preferably, in this solution, the luggage container 15 has thermally insulated walls. This solution makes the vehicle according to the invention particularly adapted to quick delivery of food products, such as cold or frozen products or cooked food products.

FIG. 2A shows a variant of the embodiment of FIG. 1, in which the air conveying structure 14 does not include a wall acting as a backrest as in the case of FIG. 1, but instead comprises two separate conduits 141 which extend along the rear uprights 130 and along the upper beams 131. The conduits 141 have outlets 142 adjacent to the front ends of the upper beams 131, so as to direct jets J vertically downwardly, towards the user. The conduits 141 can be provided with outlets also at their portions extending along the rear uprights 130 and/or along the front beams 131. In this case the system can be configured for generating two air walls at the two sides of the user, and if necessary also a front air wall in front of the user, and a rear air wall behind the user, so as to obtain a kind of insulation of the user with respect to the surrounding environment. One could provide for generating only two blades of conditioned air at the two sides of the user.

FIGS. 3-6 show a further embodiment similar to that of FIG. 1, in which the air guiding structure comprises a backrest 14 provided with outlets. In this case, the two front uprights 132 are also used for supporting a windshield 16 of polymeric material whose length can extend also beyond the uprights 132. Furthermore, in this embodiment, as well as in all the other above described embodiments, the supporting auxiliary structure 13 can also be used for supporting one or more arrays of photovoltaic panels FV. In the illustrated case, a first array of a photovoltaic panel is provided on the rear face of the backrest 14, whereas a second array is provided on a roof of the structure 13 carried by the two upper beams 131. The photovoltaic panels 16 can be advantageously used for recharging the battery on board of the vehicle, for directly supplying the air conditioning unit 12 or for aiding the battery in supplying the motor. The auxiliary supporting structure 13 can be used for supporting also a system of side airbags, for protection of the driver in case of a fall.

As clearly apparent from the foregoing description, the vehicle according to the invention provides a number of important advantageous. First of all the vehicle provides a high comfort for the user also if used in hot or cold climates.

Furthermore, the vehicle can be advantageously used as a vehicle for delivering perishable food, to be kept at low temperature, or cooked food to be kept in a heated environment.

The auxiliary supporting structure also constitutes a cell for protecting the user, to advantage for safety.

In the case of a purely electric vehicle or a vehicle with pedal assist, provided with an electric motor and a supply electric battery, the invention enables renewable energy sources to be provided easily, for recharging the battery and for supplying the air conditioning unit 12.

Finally, all the above indicated advantages are obtained with a simple and inexpensive structure.

Naturally, while the principle of the invention remains the same, the details of construction and the embodiments may widely vary with respect to what has been described and illustrated purely by way of example, without departing from the scope of the present invention.

The invention claimed is:

1. A ride-on vehicle, comprising:
   a frame,
   a rear wheel unit carried by the frame and a front wheel unit carried by a steering unit associated to the frame and including a handlebar,
   a saddle and an electric battery, which are carried by the frame,
   the frame carrying an electrically operated air conditioning unit, supplied by said battery and including at least one inlet for intake of ambient air and an outlet for emitting a flow of conditioned air, an auxiliary supporting structure connected to the frame of the vehicle, said auxiliary supporting structure comprising at least one rear upright which extends vertically upwardly above the saddle from an area located at the rear of the saddle, an air guiding structure, associated to said auxiliary supporting structure, said air guiding structure in communication with the outlet of the air conditioning unit and having one or more outlets for emitting a flow of conditioned air, said outlets configured for directing jets of conditioned air towards a body of a user;

wherein said air conditioning unit comprises:

a supporting casing defining said inlet for the intake of ambient air and said outlet for emitting a flow of conditioned air, an endless circuit for a refrigerant, which is arranged inside the casing and includes a compressor driven by an electric motor, a condenser which receives the compresses fluid by the compressor, an expansion valve for expanding the fluid coming from the condenser and an evaporated which receives the fluid expanded by said expansion valve and feeds the fluid evaporated in said evaporator to said compressor, and at least one electrically-driven fan, for generating an airflow through the evaporator and said condenser and through said outlet for conveying a flow of refrigerated or heated air into said air guiding structure.

2. The vehicle according to claim 1, wherein the auxiliary supporting structure comprises two rear uprights which are transversally spaced from each other, extending above the saddle, and which continue into two upper beams and then into two front uprights, whose lower ends are connected to a frame portion which extends in front of the handlebar.

3. The vehicle according to claim 2, wherein the front uprights carry a windshield.

4. The vehicle according to claim 3, wherein the air guiding structure comprises a hollow panel carried by the two rear uprights, so as to fulfill also the function of a backrest, and provided with a plurality of air emitting outlets adapted to direct jets of conditioned air towards the back of the user.

5. The vehicle according to claim 2, wherein the air guiding structure comprises two conduits which extend along said rear uprights and along said upper beams, and/or along said front uprights, said conduits being provided with outlets for emitting conditioned air.

6. The vehicle according to claim 5, wherein the outlets are arranged so as to generate jets of conditioned air around the user.

7. The vehicle according to claim 1, wherein the auxiliary supporting structure carries one or more arrays of photovoltaic panels for recharging the battery and for supplying the air conditioning unit.

8. The vehicle according to claim 1, further comprising a luggage container having thermally insulated walls and wherein the outlet of the air conditioning unit is connected or adapted to be connected to the containing compartment of said luggage container.

9. The vehicle according to claim 1, wherein the air conditioning unit is configured for generating an airflow through the condenser, in order to obtain a flow of heated air.

10. The vehicle according to claim 1, wherein the auxiliary supporting structure carries a system of side airbags, for protection of the user in case of a fall.

11. The vehicle according to claim 1, wherein the rear wheel unit includes two rear wheels arranged side-by-side and having substantially identical diameters and respective hubs which are coupled in rotation with each other, each rear wheel comprises a circumferential peripheral portion for contact with the ground, which is connected to a central wheel hub by means of one or more elastic elements adapted to be elastically deformed along a radial direction, in the use of the vehicle, in the portion of the wheel between the wheel hub and the part of the wheel which is in contact with the ground, so as to enable a lateral tilting of the vehicle at a bend, the two rear wheels are axially spaced from each other by a length between 0.2 and 0.95 times their diameter so that the vehicle has a stable upright static position, whereas the difference of the peripheral speeds of the two rear wheels at a bend is sufficiently low for being compensated by the different elastic deformations of the elastic elements of the two rear wheels.

12. The vehicle according to claim 11, wherein the two rear wheels are axially spaced from each other by a length between 0.3 and 0.4 times their diameter.

13. The vehicle of claim 1, wherein the vehicle comprises a bicycle or a three-wheel vehicle.

14. The vehicle of claim 13, wherein the bicycle or the three-wheel vehicle comprises an electrically-driven or pedal-assist bicycle or three-wheel vehicle.

15. A ride-on vehicle, comprising:

a frame, a rear wheel unit carried by the frame and a front wheel unit carried by a steering unit associated to the frame and including a handlebar, a saddle and an electric battery, which are carried by the frame, the frame carrying an electrically operated air conditioning unit, supplied by said battery and including at least one inlet for intake of ambient air and an outlet for emitting a flow of conditioned air, an auxiliary supporting structure connected to the frame of the vehicle, said auxiliary supporting structure comprising at least one rear upright which extends vertically upwardly above the saddle from an area located at the rear of the saddle, an air guiding structure, associated to said auxiliary supporting structure, said air guiding structure in communication with the outlet of the air conditioning unit and having one or more outlets for emitting a flow of conditioned air, said outlets configured for directing jets of conditioned air towards a body of a user, and a luggage container having thermally insulated walls and wherein the outlet of the air conditioning unit is connected or adapted to be connected to the containing compartment of said luggage container.

* * * * *